United States Patent [19]

Fox

[11] 4,319,428
[45] Mar. 16, 1982

[54] ADJUSTABLE TREE TIE DOWN

[76] Inventor: Daniel W. Fox, 202 E. Sharon, Phoenix, Ariz. 85022

[21] Appl. No.: 107,881

[22] Filed: Dec. 28, 1979

[51] Int. Cl.³ ............................................. A01G 17/06
[52] U.S. Cl. ..................................... 47/42; 24/131 C; 24/115 H; 403/210
[58] Field of Search ................... 47/42, 43, 44, 45, 46, 47/47; 119/96, 109, 121, 122, 120; 24/5, 6, 17 A, 17 B, 18, 271, 68 PP, 68 CD, 73 PH, 73 PS, 115 H, 122, 3, 131 C, 136 R, 115 K, 31 C; 52/148, 149; 87/6–11; 273/6 E; 403/209–212; 135/15 CF, 15 PE; 224/257–262

[56] References Cited

U.S. PATENT DOCUMENTS

| | | | |
|---|---|---|---|
| 499,520 | 6/1893 | Cook | 47/43 |
| 1,441,474 | 1/1923 | Baker | 37/9 X |
| 2,572,889 | 10/1951 | Strykower | 24/115 H X |
| 3,040,477 | 6/1962 | June | 47/42 |
| 3,102,715 | 9/1963 | Weitzel et al. | 87/9 X |
| 3,526,056 | 9/1970 | Stropkay | 47/42 |
| 4,186,921 | 2/1980 | Fox | 24/115 H X |

FOREIGN PATENT DOCUMENTS

| | | | |
|---|---|---|---|
| 18735 | 8/1882 | Austria | 47/44 |
| 129444 | 9/1950 | Sweden | 47/47 |
| 25054 | of 1910 | United Kingdom | 47/44 |
| 476105 | 12/1937 | United Kingdom | 24/115.H |

Primary Examiner—James R. Feyrer
Attorney, Agent, or Firm—Harvey B. Jacobson

[57] ABSTRACT

An adjustable tie-down for newly planted trees and other similar purposes includes a ground inserted stake and a hollow braided flexible line or rope for attachment between a tree and the stake. The line has a loop formed on one end for engagement with the stake and a loop at the other end for positioning around the crotch area or juncture of a tree trunk and limb and an intermediate portion that is longitudinally adjustable in a unique manner which enables the adjustment to be accomplished after the tie-down has been assembled with respect to the stake and tree. The longitudinal adjustment is obtained by doubling the end portion of the tie-down to define the loop with a portion of the doubled line passing interiorly of and longitudinally of the hollow braided line and with portions of the doubled line being provided with spaced plastic sleeves which serve as keepers to secure the line in an adjusted relationship, but enabling easy and quick longitudinal adjustment thereof.

4 Claims, 9 Drawing Figures

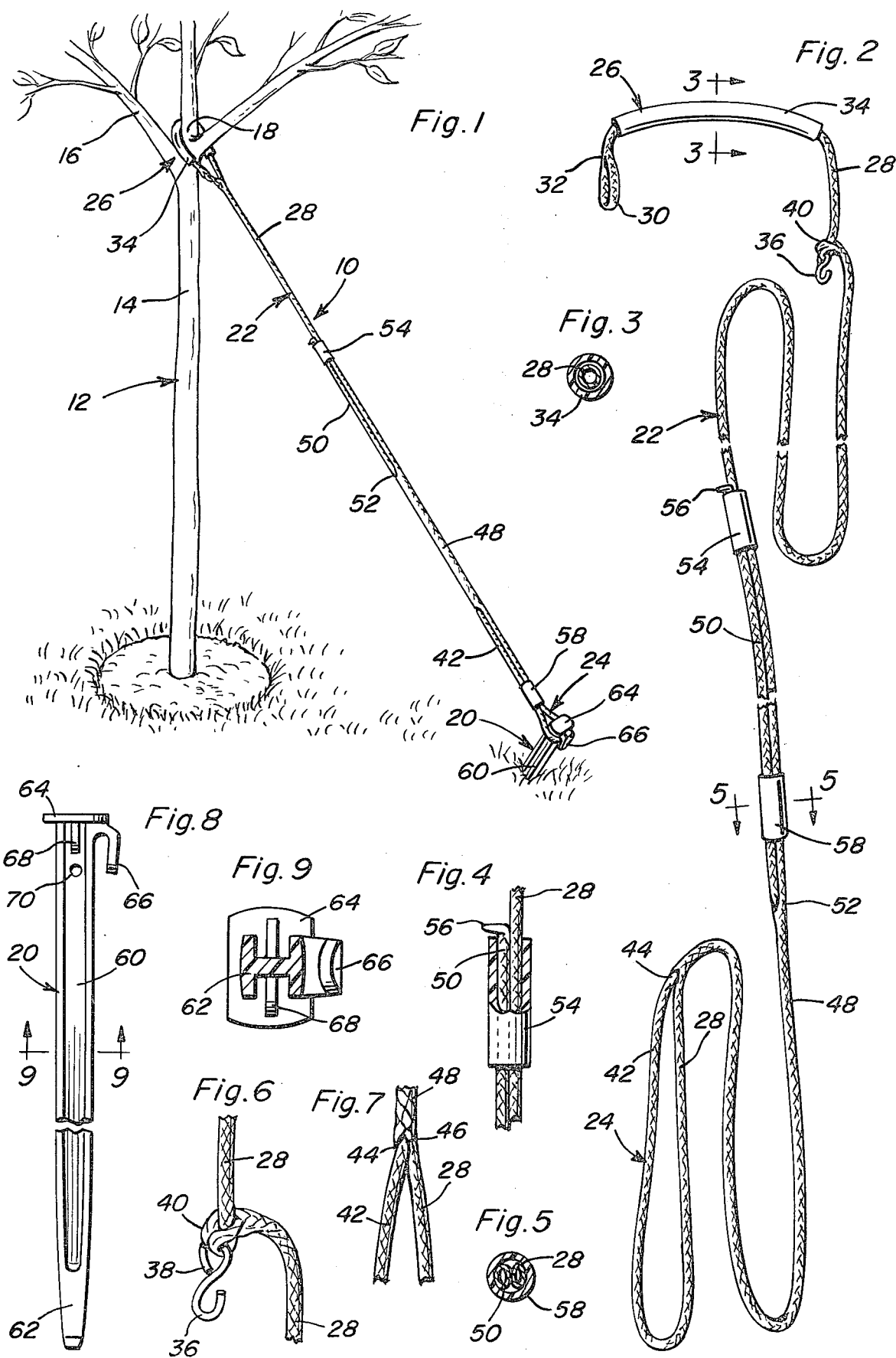

ADJUSTABLE TREE TIE DOWN

BACKGROUND OF THE INVENTION

1. Field of the Invention

The present invention generally relates to an adjustable tie-down for use with newly planted trees, and the like, with facilities for easy connection with the tree, easy anchoring to the ground surface and adjustment of the tie-down after assembly without tieing knots, and the like.

2. Description of the Prior Art

When transplanting trees, it is usually necessary to anchor the newly planted tree in a vertical position. This is usually accomplished by a plurality of flexible lines, guy wires, or the like, which are connected to the tree trunk at a point spaced above the ground and extended downwardly and outwardly in an inclined direction for adjustable connection to a ground inserted stake. While such procedures work effectively, the installation of the anchoring devices or tie-downs is relatively time consuming inasmuch as each of the lines or guy wires must be adjusted as to length while they are being installed, that is, while they are connected to the ground anchor, or the like. It is also conventional practice to wrap the tree trunk with burlap or other protective material at the point where the anchoring device or tie-down encircles the tree trunk to reduce the possibility of injury to the tree which requires additional time in properly installing existing tree tie-downs, anchoring devices, and the like.

SUMMARY OF THE INVENTION

The present invention generally relates to a tie-down for trees, and the like, which is longitudinally adjustable after installation and includes a ground inserted stake having a hook-shaped lip at the upper end for receiving a loop end of a double portion of an adjustable line with the line including a loop forming assembly at the upper end for engagement around the crotch area of a juncture between the tree trunk and a limb.

Another object of the invention is to provide a tie-down in accordance with the preceding object in which the ground inserted stake is of one-piece plastic material having a cross-sectional configuration to strengthen and rigidify the stake with the downwardly opening hook-shaped lip portion being of unitary construction therewith and the upper end having a flattened end to facilitate driving the stake into the ground.

Yet another object of the invention is to provide a tie-down in accordance with the preceding objects in which the loop forming means at the upper end of the line is in the form of a plastic sleeve through which the line extends with the free end of the line being reversely doubled to form a loop and a hook being connected to the line in spaced relation to the plastic sleeve to hook into the loop to provide a closed loop with the plastic sleeve being arcuately formed so that the line will not actually come into contact with the tree trunk and limb when tension is exerted on the line.

Yet another important object of the present invention is to provide a tie-down in accordance with the preceding objects in which the doubled loop end at the lower end of the line is formed by threading portions of the free end of the line through the hollow center of the braided line and provide keeper plastic sleeves slidable thereon so that the line can be quickly and effectively adjusted as to its length after installation and without requiring any knots to be tied, but yet the line is retained securely in adjusted position.

Still another important feature of the present invention is to provide an adjustable tie-down for trees and for other purposes where anchoring devices, tie-downs, or the like, are required, which is simple in construction, inexpensive to manufacture, effective in use and durable and long lasting.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the adjustable tree-tie down of the present invention illustrating the manner in which one of the tie-downs is associated with a newly planted tree.

FIG. 2 is an elevational view of the adjustable line illustrating the loop formed at the lower end and the loop forming assembly at the upper end together with the keeper sleeves associated therewith.

FIG. 3 is a transverse, sectional view taken substantially upon a plane passing along section line 3—3 of FIG. 2 illustrating the relationship of the protective plastic sleeve forming a portion of the loop forming assembly at the upper end of the line.

FIG. 4 is a fragmental sectional view of the upper of the two plastic keeper sleeves.

FIG. 5 is a transverse, sectional view taken substantially upon a plane passing along section line 5—5 of FIG. 2 illustrating the structural relationship of the keeper sleeve at the lower portion of the doubled line.

FIG. 6 is a fragmental elevational view illustrating the manner in which the hook forming a portion of the upper loop forming means is connected to the line.

FIG. 7 is a fragmental detailed elevational view illustrating the manner in which the doubled line passes into the hollow center of the braided line.

FIG. 8 is a side elevational view of the ground engaging stake.

FIG. 9 is a transverse, sectional view taken substantially upon a plane passing along section line 9—9 of FIG. 8 illustrating further structural details of the ground engaging stake.

DESCRIPTION OF THE PREFERRED EMBODIMENT

Referring now specifically to the drawings, the adjustable tie-down of the present invention is generally designated by reference numeral 10. While a single tie-down is illustrated in FIG. 1, it is pointed out that multiple tie-downs may be used in connection with each tree to be anchored. Usually, at least three tie-downs would be used with each tree in order to secure the tree in a desired orientation. As illustrated, the tree, generally designated by the numeral 12, includes a trunk 14 and limbs 16 with the tie-down 10 being connected to the tree generally in a crotch area 18 in the juncture between a limb 16 and the trunk 14 at a point spaced substantially above the surface of the soil in which the tree 12 is planted. The tie-down 10 includes a ground inserted stake 20 and an elongated flexible line 22 having a lower loop 24 engageable with the stake 20 and an upper loop forming means 26 engageable around the tree trunk 14 and over a limb 16 so that it is positioned in a crotch area 18 which prevents the loop forming means 26 from sliding down the tree trunk 14.

The line 22 is a single elongated length of braided rope or line having a hollow center, preferably constructed of plastic material, such as nylon, polypropylene, or the like, and is of conventional and commercially available construction in which the strands forming the braided line can be separated sufficiently to enable the free end of the line to be passed into and longitudinally along the hollow center of the line.

As illustrated, the single line is designated by numeral 28 and the loop forming means 26 at the upper end thereof has a reversely folded end portion defining a small closed loop 30 which is formed by the free end of the single line 28 passing back into the hollow interior of the line 28 as at 32 in a manner more clearly illustrated in FIG. 7. Positioned on the single line 28 adjacent the loop 30 is an elongated sleeve 34 constructed of plastic material which is normally straight, but capable of being curved into an arc when the ends thereof are forced towards each other. The sleeve is positioned over that portion of the single line 28 which has the free end thereof received in the hollow center in order to retain the loop 30 in its formed condition. The single line 28 is also provided with an S-shaped hook 36 in its formed condition. The single line 28 is also provided with an S-shaped hook 36 in spaced relation to the end of the sleeve 34 remote from the loop 30 with one end of the S-shaped hook 36 being closed as at 38 to permanently secure itself to a loop 40 formed in the single line 28 as illustrated in FIG. 6. The open hook end of the S-shaped hook 36 then may be engaged with the loop 30 to shape the sleeve 34 into arcuate configuration and to form a loop which engages the crotch area 18 of the tree 12 with the plastic sleeve 34 actually engaging the tree to protect the bark of the tree from injury when tension is exerted on the line 22. As illustrated in FIG. 6, the loop 40 is defined by separating the strands of the braided line and passing the free end thereof therethrough thus defining, in effect, a snare loop 40 which provides a mounting for the S-shaped hook 36.

The lower loop 24 is formed by the single line 28 being doubled back with the doubled back portion being designated by the numeral 42 and the free end thereof being inserted into the hollow center of the single line 28 as at 44 as illustrated in FIGS. 2 and 7 in which the strands 46 are separated to enable the doubled back line 42 to be inserted into the hollow center core and passed longitudinally therein for a substantial length with the length of the single line 28 having the doubled back line 42 therein being designated by numeral 48 in FIGS. 1 and 2. The free end portion 50 of the doubled back portion 42 of the single line 28 exits from the single line 28 as at 52 and extends alongside of and parallel to the single line 28 as illustrated in FIG. 4 and is held in assembled relation alongside of the single line 28 by a keeper sleeve 54. The terminal end of the free end portion 50 of the braided line or rope is provided with an enlargement or lateral extension 56 which is formed by heating and flattening the terminal end thereby providing an enlargement so that the sleeve 54, constructed of plastic material, or the like, can slide longitudinally with respect to the single line 28 and the terminal end portion 50 of the doubled back portion 42, but cannot slide upwardly off of the terminal end 50 in view of the enlargement or lateral extension 56 as illustrated in FIG. 4. A second keeper sleeve 58 is provided on the lower end portion of the line 28 and is longitudinally slidable along the length of the line from a point adjacent the stake 20 to a point adjacent the upper keeper sleeve 54. Both of the sleeves 54 and 58 are preferably constructed of plastic material similar to the sleeve 34 and enable the effective length of the tie-down 10 to be adjusted after it has been assembled on the tree 12 and the stake 20 in a manner described hereinafter.

Assuming that the tie-down 10 is installed in the maner illustrated in FIG. 1 and it is found that the overall length thereof is too long, the effective length can be shortened by moving both of the sleeves 54 and 58 longitudinally into registry with the portion 48 of the single line 28 having the doubled back portion 42 extending therethrough after which the terminal free end portion 50 of the doubled back portion 42 can be moved longitudinally toward the tree inasmuch as the portion of the doubled back line 42 which extends through the hollow center of the single line 28 can move longitudinally in either direction when the sleeves 54 and 58 are in registry with the portion 48 so that the effective length of the line can be shortened or lengthened. When adjusting the length of the tie-down, it is usually necessary to retain the single line 28 generally in taut condition to prevent the line from becoming kinked or looped, although excessive tension on the single line 28 will bind the doubled back portion 42 where it extends through the center of the single line 28 since tension on the line 28 tends to collapse the hollow center thereof so that it is only necessary to maintain the line 28 in a straight line condition during the adjustment. After final adjustment has been made and the desired length obtained, the sleeve 54 is moved longitudinally upwardly until it engages the side-by-side portions of the free end 50 of the doubled back portion of the line 42 and the single line 28. The sleeve 58 is moved longitudinally downwardly to a point adjacent the stake 20 as illustrated in FIG. 1 so that the two keeper sleeves 54 and 58 will effectively maintain the adjusted length of the tie-down with the tension on the single line 28 tending to collapse the hollow center core of the braided line combining with the sleeves 58 and 54 to securely lock the tie-down in adjusted length condition, but also enabling easy readjustment thereof when necessary.

The stake 20 having an elongated plastic member 60 of H-shaped cross-sectional configuration is illustrated in FIG. 9 with the lower end thereof tapering as at 62 to facilitate ground insertion and the upper end having a flat plate 64 formed thereon to provide an impact surface for engagement by a hammer or other tool used to drive the stake 20 into the ground in an inclined relation as illustrated in FIG. 1. The upper end of the stake 20 is provided with a downwardly opening hook-shaped lip 66 which is oriented remote from the tree 12 when the stake is driven into the ground so that the loop 24 will be retained on the stake 20 by the hook-shaped lip 66 when assembled therewith. The hook-shaped lip and associated surfaces are rounded or curved to eliminate sharp corners and the juncture between the side portions of the top plate 64 and the member 60 are reinforced by gussets 68 and an aperture 70 is provided through the member 60 adjacent the upper end thereof to enable a plurality of the stakes to be tied together by a wire or the like for shipment or packaging. The stake 20 is preferably constructed of plastic material having sufficient strength and rigidity to maintain the tie-down 10 properly assembled and tensioned with respect to the tree. It is pointed out that various materials may be used in constructing the stake and the over-all length thereof may be varied depending upon the installation requirements and the angle at which the stake is driven into the ground is varied depending upon the individual installing the stake.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An adjustable tie-down for trees and the like, said tie-down comprising:

an elongated, continuous, flexible, hollow center line;

hook means attachable to a portion of and being remotely located from a first end of said line;

first loop means formed proximate to said first end of said line;

first sleeve means concentrically positionable over and being slidable along a portion of said line between said first loop means and said hook means;

second loop means selectably formable to effect a positioning of said first sleeve means about a tree and the like, said second loop means being formed by engaging said first loop means with said hook means to accomplish said positioning;

third loop means formed in a portion of said line and being of an adjustable construction, said third loop means being attachable to a stake and the like to effectively secure said tie-down in an operable position, said loop means being formed by a doubled back portion of said line with a second end thereof being inserted through strands forming a periphery of said line into said hollow center thereof and being directed along a predetermined longitudinal length thereof within said hollow center, said second end then exiting to an exterior portion of said line;

second sleeve means concentrically positionable over and being slidable along a portion of said doubled back portion of said line located between said third loop means and a point of insertion of said second end of said line into said hollow center;

third sleeve means concentrically positionable over and being slidable along a portion of said doubled back portion of said line located between said second end and a point where said second end exits from said hollow center; and stop means formed on said second end whereby said third sleeve means is prevented from becoming slidably disengaged from said doubled back portion of said line.

2. The adjustable tie-down for trees and the like as defined in claim 1, wherein said first loop means is formed by said first end of said line being inserted through strands forming a periphery of said line into said hollow center thereof and being directed along a predetermined longitudinal length thereof within said hollow center, said first sleeve means serving to facilitate a retention of said first end within said hollow center.

3. The adjustable tie-down for trees and the like as defined in claim 2, wherein said line is of a braided construction conducive to a manufacture of a line having a hollow center formed therein.

4. The adjustable tie-down for trees and the like as defined in claim 3, and further including a stake for insertion into a ground surface, said stake being of a one-piece plastic construction having a tapered lower end and a flat plate on an upper end, said upper end of the stake including a downwardly opening hook-shaped lip to receive said third loop means with said second sleeve means being movable toward said stake to retain said third loop means in a close encircling relation thereto.

* * * * *